(12) United States Patent
Ganiger et al.

(10) Patent No.: US 10,001,028 B2
(45) Date of Patent: Jun. 19, 2018

(54) DUAL SPRING BEARING SUPPORT HOUSING

(75) Inventors: Ravindra Shankar Ganiger, Bangalore (IN); Stephanie Frances Drummond, Cambridge, MA (US); Daryl Scott Schneider, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1134 days.

(21) Appl. No.: 13/453,837

(22) Filed: Apr. 23, 2012

(65) Prior Publication Data
US 2013/0280063 A1    Oct. 24, 2013

(51) Int. Cl.
| | |
|---|---|
| F01D 25/16 | (2006.01) |
| F02C 7/06 | (2006.01) |
| F16C 27/04 | (2006.01) |
| F16C 19/54 | (2006.01) |
| F16C 35/04 | (2006.01) |

(52) U.S. Cl.
CPC ........... *F01D 25/16* (2013.01); *F01D 25/164* (2013.01); *F02C 7/06* (2013.01); *F16C 19/54* (2013.01); *F16C 27/04* (2013.01); *F16C 35/042* (2013.01); *F05D 2230/64* (2013.01); *F05D 2250/312* (2013.01); *F05D 2250/36* (2013.01); *F05D 2250/37* (2013.01); *F16C 2360/23* (2013.01)

(58) Field of Classification Search
CPC ...... F01D 25/16; F01D 25/162; F01D 25/164; F04D 29/04; F04D 29/046; F04D 29/049; F04D 29/059; F02C 7/06; F16C 19/54; F16C 27/0435; F16C 2360/23; F05D 2230/64; F05D 2250/312; F05D 2250/36; F05D 2250/37

USPC ........................................................ 415/229
See application file for complete search history.

(56) References Cited

U.S. PATENT DOCUMENTS

| | | |
|---|---|---|
| 2,521,638 A | 9/1950 | Magnus |
| 3,011,840 A | 12/1961 | Littleford |
| | (Continued) | |

FOREIGN PATENT DOCUMENTS

| | | |
|---|---|---|
| CN | 1451077 A | 10/2003 |
| CN | 101014753 A | 8/2007 |
| | (Continued) | |

OTHER PUBLICATIONS

U.S. Appl. No. 13/286,792, filed Nov. 1, 2011.
(Continued)

*Primary Examiner* — Aaron R Eastman
(74) *Attorney, Agent, or Firm* — General Electric Company; Pamela Kachur (57) ABSTRACT

A bearing support housing for a gas turbine engine includes: an annular mounting flange; a first bearing cage including: an annular first bearing support ring; and an annular array of axially-extending first spring arms interconnecting the first bearing support ring and the mounting flange; and a second bearing cage including: an annular second bearing support ring; and an annular array of axially-extending second spring arms interconnecting the second bearing support ring and the mounting flange, the second spring arms defining spaces therebetween. The first spring arms are received between the second spring arms, and the bearing cages are sized so as to permit independent flexing motion of the first and second spring arms.

21 Claims, 7 Drawing Sheets

(56) References Cited

U.S. PATENT DOCUMENTS

| | | | |
|---|---|---|---|
| 3,133,693 | A | 5/1964 | Matthew |
| 3,325,088 | A | 6/1967 | Storer et al. |
| 3,536,369 | A | 10/1970 | Ainsworth et al. |
| 3,703,081 | A | 11/1972 | Krebs et al. |
| 3,901,557 | A | 8/1975 | Daniels |
| 4,084,861 | A * | 4/1978 | Greenberg et al. .............. 384/99 |
| 4,186,975 | A | 2/1980 | Frommlet et al. |
| 4,201,426 | A | 5/1980 | Brozenske et al. |
| 4,245,951 | A | 1/1981 | Minnick |
| 4,289,360 | A | 9/1981 | Zirin |
| 4,304,522 | A | 12/1981 | Newland |
| 4,322,117 | A | 3/1982 | Briggs |
| 4,451,110 | A | 5/1984 | Forestier et al. |
| 4,652,219 | A | 3/1987 | McEachern, Jr. et al. |
| 4,676,667 | A | 6/1987 | Komatsu et al. |
| 4,693,616 | A | 9/1987 | Rohra et al. |
| 4,872,767 | A | 10/1989 | Knapp |
| 4,981,415 | A | 1/1991 | Marmol et al. |
| 5,052,828 | A * | 10/1991 | Ciokajlo et al. .............. 384/476 |
| 5,080,555 | A | 1/1992 | Kempinger |
| 5,088,840 | A | 2/1992 | Radtke |
| 5,201,844 | A | 4/1993 | Greenwood et al. |
| 5,237,817 | A | 8/1993 | Bornemisza |
| 5,619,850 | A | 4/1997 | Palmer et al. |
| 6,240,719 | B1 | 6/2001 | Vondrell et al. |
| 6,338,578 | B1 | 1/2002 | Adde et al. |
| 6,402,469 | B1 | 6/2002 | Kastl et al. |
| 6,413,046 | B1 | 7/2002 | Penn et al. |
| 6,439,772 | B1 | 8/2002 | Ommundson et al. |
| 6,443,698 | B1 | 9/2002 | Corattiyil et al. |
| 6,447,248 | B1 | 9/2002 | Kastl et al. |
| 6,540,483 | B2 | 4/2003 | Allmon et al. |
| 6,558,041 | B2 | 5/2003 | Laos |
| 6,679,045 | B2 | 1/2004 | Karafillis et al. |
| 6,698,936 | B2 | 3/2004 | Dardelet et al. |
| 6,821,083 | B2 | 11/2004 | Lathrop et al. |
| 6,846,158 | B2 | 1/2005 | Hull |
| 7,322,181 | B2 | 1/2008 | Lapergue et al. |
| 7,384,199 | B2 | 6/2008 | Allmon et al. |
| 7,634,913 | B2 | 12/2009 | Singh et al. |
| 8,182,156 | B2 | 5/2012 | Kinnaird et al. |
| 2003/0210979 | A1 | 11/2003 | Doerflein et al. |
| 2004/0047731 | A1 | 3/2004 | Hull |
| 2005/0100258 | A1* | 5/2005 | Brossier et al. .............. 384/477 |
| 2005/0287018 | A1 | 12/2005 | Mavrosakis |
| 2006/0045404 | A1* | 3/2006 | Allmon et al. .............. 384/581 |
| 2006/0083449 | A1 | 4/2006 | Laurant et al. |
| 2006/0153483 | A1 | 7/2006 | Bridges et al. |
| 2007/0104403 | A1 | 5/2007 | Kawamura et al. |
| 2008/0063333 | A1 | 3/2008 | Bruno et al. |
| 2008/0131277 | A1 | 6/2008 | Shatz et al. |
| 2008/0152483 | A1* | 6/2008 | Godleski ...................... 415/142 |
| 2009/0214147 | A1 | 8/2009 | Duong |
| 2010/0027930 | A1* | 2/2010 | Kinnaird et al. ............. 384/523 |
| 2010/0054650 | A1 | 3/2010 | Endres et al. |
| 2011/0150372 | A1* | 6/2011 | Care et al. ........................ 384/1 |
| 2012/0189429 | A1* | 7/2012 | Witlicki ....................... 415/119 |
| 2012/0213629 | A1* | 8/2012 | Rouesne .................... 415/170.1 |
| 2012/0263578 | A1* | 10/2012 | Davis et al. ............... 415/122.1 |
| 2012/0321447 | A1* | 12/2012 | Dijoud et al. ................ 415/142 |

FOREIGN PATENT DOCUMENTS

| | | |
|---|---|---|
| DE | 102004040340 A1 | 2/2006 |
| EP | 1626188 A2 | 2/2006 |
| EP | 2149681 A2 | 2/2010 |
| FR | 2951232 A1 | 4/2011 |
| GB | 2326679 A | 12/1998 |
| JP | 4919209 A | 2/1974 |
| JP | 54151712 A | 11/1979 |
| JP | 57186616 A | 11/1982 |
| JP | 2002525519 A | 8/2002 |
| JP | 2004263854 A | 9/2004 |
| JP | 2005240799 A | 9/2005 |
| JP | 2009270612 A | 11/2009 |
| WO | 0169047 A1 | 9/2001 |

OTHER PUBLICATIONS

U.S. Appl. No. 13/453,796, filed Apr. 23, 2012.
PCT Search Report and Written Opinion dated Mar. 6, 2014 issued in connection with corresponding PCT Patent Application No. PCT/US2013/037509.
Unoffcial translation of JP Office Action dated Nov. 24, 2015 in relation to corresponding JP Application 2015-507242.
Unofficial English translation of Office Action issued in connection with corresponding CN Application No. 201380021474.8 dated May 28, 2013.
U.S. Non-Final Office Action issued in connection with Related U.S. Appl. No. 12/183,489 dated Sep. 14 2011.
PCT Search Report and Written Opinion issued in connection with Related PCT Application No. PCT/US2012/062781 dated Feb. 14, 2013.
U.S. Non-Final Office Action issued in connection with Related U.S. Appl. No. 13/286,792 dated May 23, 2013.
Chinese Office Action issued in connection with Related CN Application No. 201280065406.7 dated Feb. 28, 2015.
Unofficial English Translation of Japanese Office Action issued in connection with Related JP Application No. 2014540037 dated May 12, 2015.
Unofficial English Translation of Japanese Notice of Allowance issued in connection with Related JP Application No. 2014540037 dated Oct. 13, 2015.
Unofficial English Translation of Japanese Office Action issued in connection with corresponding JP Application No. 2015507242 dated Nov. 1, 2016.
U.S. Appl. No. 13/286,792, filed Nov. 1, 2011, Kevin Michael Do et al.
U.S. Appl. No. 12/1834,89, filed Jul. 31, 2008, Ray Harris Kinnaird et al.
U.S. Appl. No. 12/183,489, filed Jul. 31, 2008, Kinnaird et al.
U.S. Appl. No. 13/286,792, filed Nov. 1, 2011, Do et al.
U.S. Appl. No. 13/453,796, filed Apr. 23, 2012, Do et al.
Japanese Search Report issued in connection with related JP Application No. 2009-172611 dated Jul. 12, 2013.
Non-Final Rejection towards related U.S. Appl. No. 13/453,796 dated Sep. 25, 2013.
Notice of Allowance issued in connection with related JP Application No. 2014-540040 dated Nov. 4, 2015.
Japanese Search Report issued in connection with related JP Application No. 2014-540040 dated May 15, 2015.
Japanese Search Report issued in connection with related JP Application No. 2015-507242 dated Nov. 13, 2015.

* cited by examiner

DUAL SPRING BEARING SUPPORT HOUSING

BACKGROUND OF THE INVENTION

This invention relates generally to gas turbine engine bearings and more particularly to mounting arrangements for such bearings.

It is known to support bearings, such as the large rolling-element bearings used in gas turbine engines, using spring centering cages. The spring constant of such cages can be manipulated to provide a desired stiffness and consequently affect the dynamics and vibration modes of the engine. Particularly in large aircraft turbofan engines, it has been demonstrated that engine dynamics will suffer significantly if such cages are not used.

Many gas turbine engines have at least one sump that includes two or more rolling element bearings positioned in close proximity to each other. These sumps have limited axial and radial space available to be used for bearings, spring cages, intermediate gearbox mounting, damper housings, air and oil seals, air pressurization channels, and oil transport between parts of the sump. The axial and radial space needed for an individual spring centering cage for each bearing, which is greater than required for a conventional stiff bearing mounting, is inconsistent with the need to keep the engine as small and light as possible.

Accordingly, there is a need for a bearing support adapted to mount multiple rolling element bearings in a confined space.

BRIEF SUMMARY OF THE INVENTION

This need is addressed by the present invention, which provides an integral component incorporating two spring cages that are nested within each other, so as to operate independently, while only occupying the space normally required for a single spring bearing cage.

According to one aspect of the invention, a bearing support housing for a gas turbine engine, includes: an annular mounting flange; a first bearing cage including: an annular first bearing support ring; an annular array of axially-extending first spring arms interconnecting the first bearing support ring and the mounting flange; and a second bearing cage including: an annular second bearing support ring; and an annular array of axially-extending second spring arms interconnecting the second bearing support ring and the mounting flange, the second spring arms defining spaces therebetween; wherein the first spring arms are received between the second spring arms, and the bearing cages are sized so as to permit independent flexing motion of the first and second spring arms According to another aspect of the invention, a bearing assembly for a gas turbine engine includes: an annular mounting flange secured to a stationary member of the engine; a first bearing cage including: an annular first bearing support ring; and an annular array of axially-extending first spring arms interconnecting the first bearing support ring and the mounting flange; a rolling-element first bearing mounted in the first bearing support ring; a second bearing cage including: an annular second bearing support ring; and an annular array of axially-extending second spring arms interconnecting the second bearing support ring and the mounting flange, the second spring arms defining spaces therebetween; a rolling-element second bearing mounted in the second bearing support ring; and a shaft mounted in the first and second bearings; wherein the first spring arms are received between the second spring arms, and the bearing cages are sized so as to permit independent flexing motion of the first and second spring arms.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
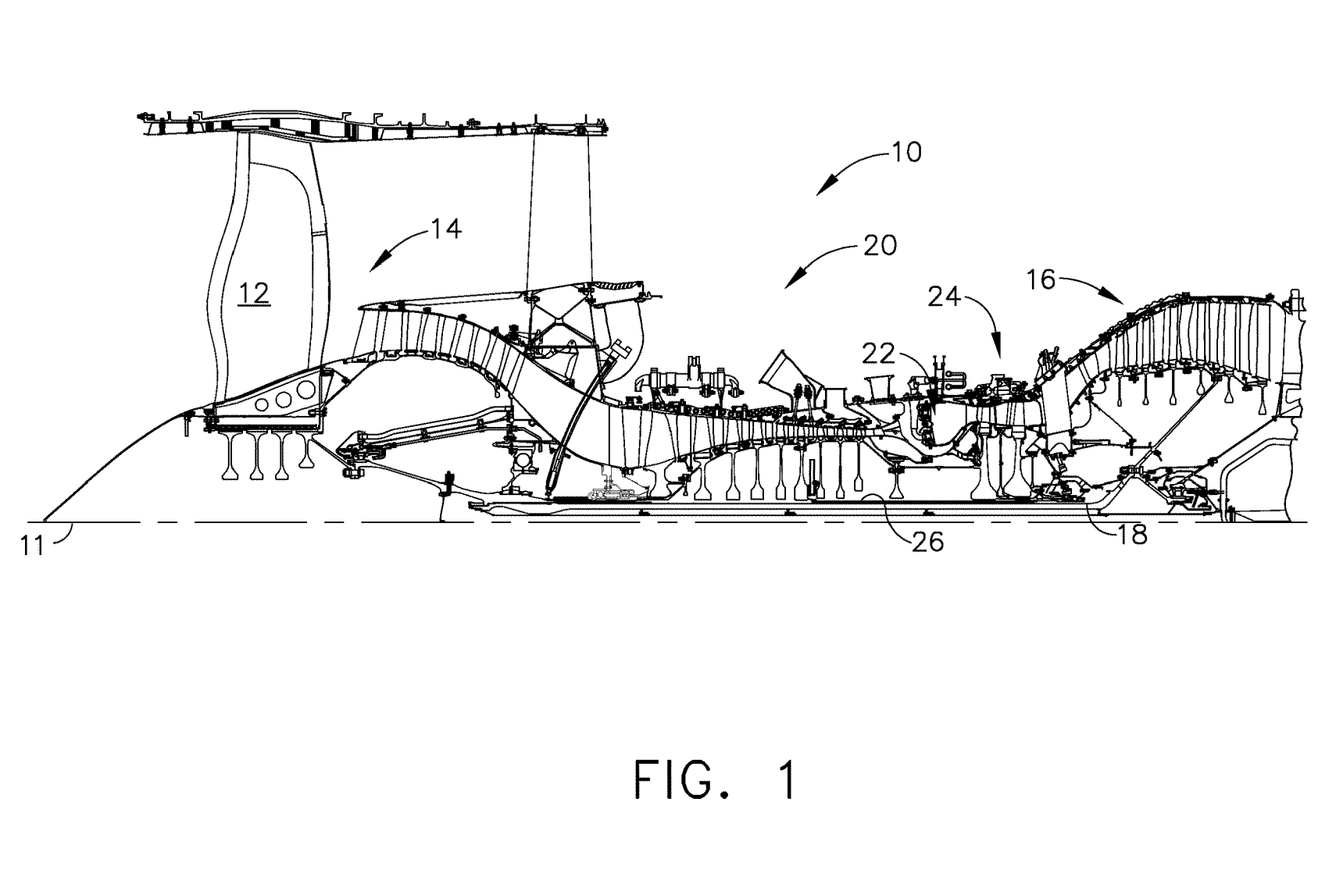
FIG. 1 is a half-cross-sectional view of a gas turbine engine incorporating nested bearing spring cages constructed according to an aspect of the present invention.

Referring to the drawings wherein identical reference numerals denote the same elements throughout the various views, FIG. 1 depicts a gas turbine engine 10. The engine 10 has a longitudinal axis 11 and includes a fan 12, a low pressure compressor or "booster" 14 and a low pressure turbine ("LPT") 16 collectively referred to as a "low pressure system". The LPT 16 drives the fan 12 and booster 14 through an inner shaft 18, also referred to as an "LP shaft". The engine 10 also includes a high pressure compressor ("HPC") 20, a combustor 22, and a high pressure turbine ("HPT") 24, collectively referred to as a "gas generator" or "core". The HPT 24 drives the HPC 20 through an outer shaft 26, also referred to as an "HP shaft". Together, the high and low pressure systems are operable in a known manner to generate a primary or core flow as well as a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications.

The inner and outer shafts 18 and 26 are mounted for rotation in several rolling-element bearings. The bearings are located in enclosed portions of the engine 10 referred to as "sumps".

Figure 2:
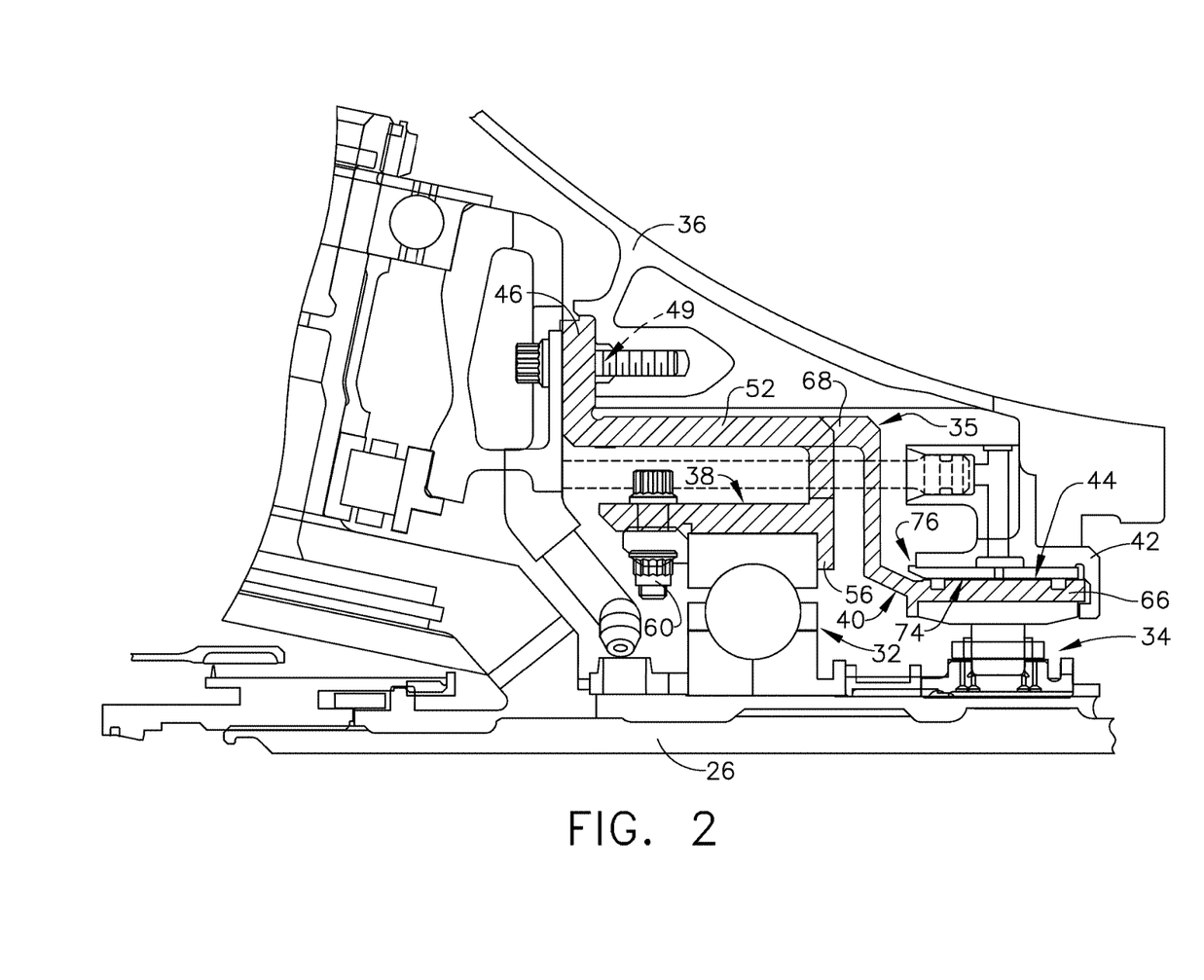
FIG. 2 is an enlarged view of a bearing compartment of the gas turbine engine of FIG. 1.

FIG. 2 shows a portion of a sump of the engine 10 in more detail. The forward end of the outer shaft 26 is carried by a ball-type first bearing 32 and a roller-type second bearing 34 which in common nomenclature are referred to as the "#3B bearing" and the "#3R bearing", respectively. A static annular frame member referred to as a fan hub frame 36 surrounds the first and second bearings 32 and 34. The first and second bearings 32 and 34 are connected to the fan hub frame 36 by a bearing support housing 35. A stationary damper housing 42 with a cylindrical inner surface 44 surrounds the second bearing 34.

Figure 3:
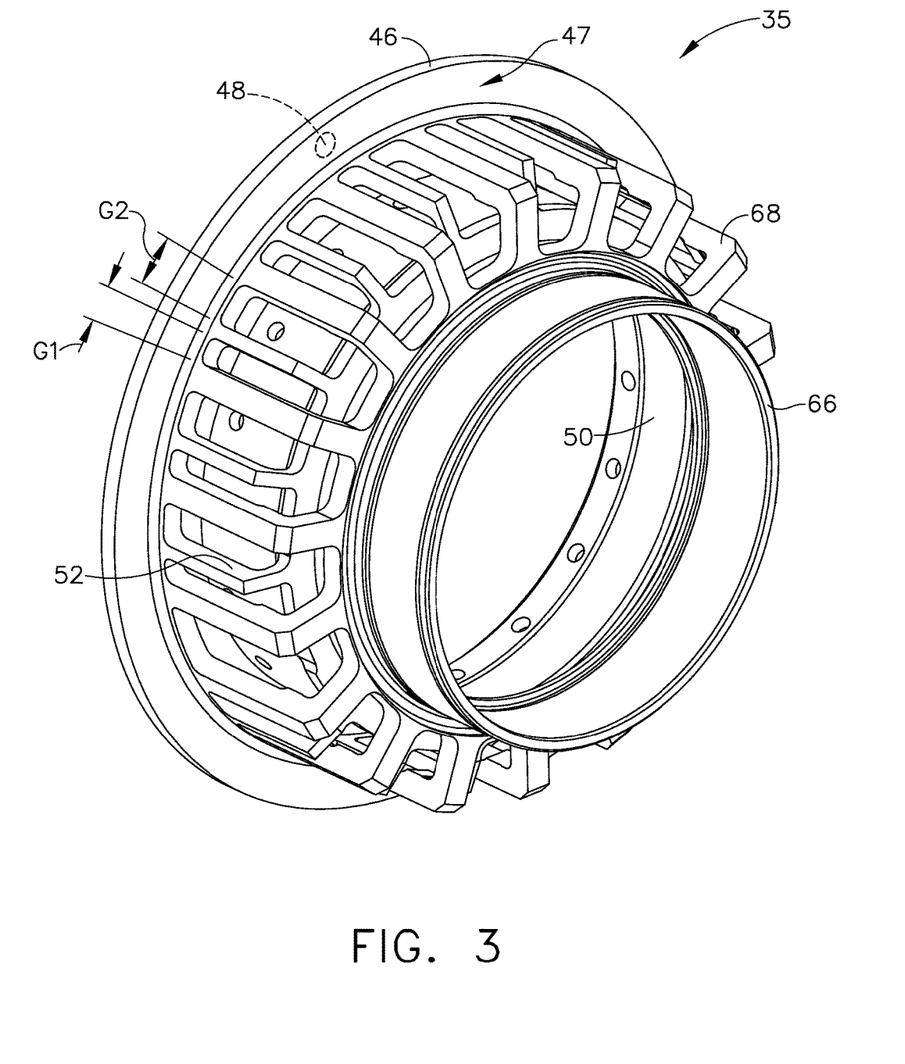
FIG. 3 is a perspective view of a bearing support housing shown in FIG. 2.
Figure 4:
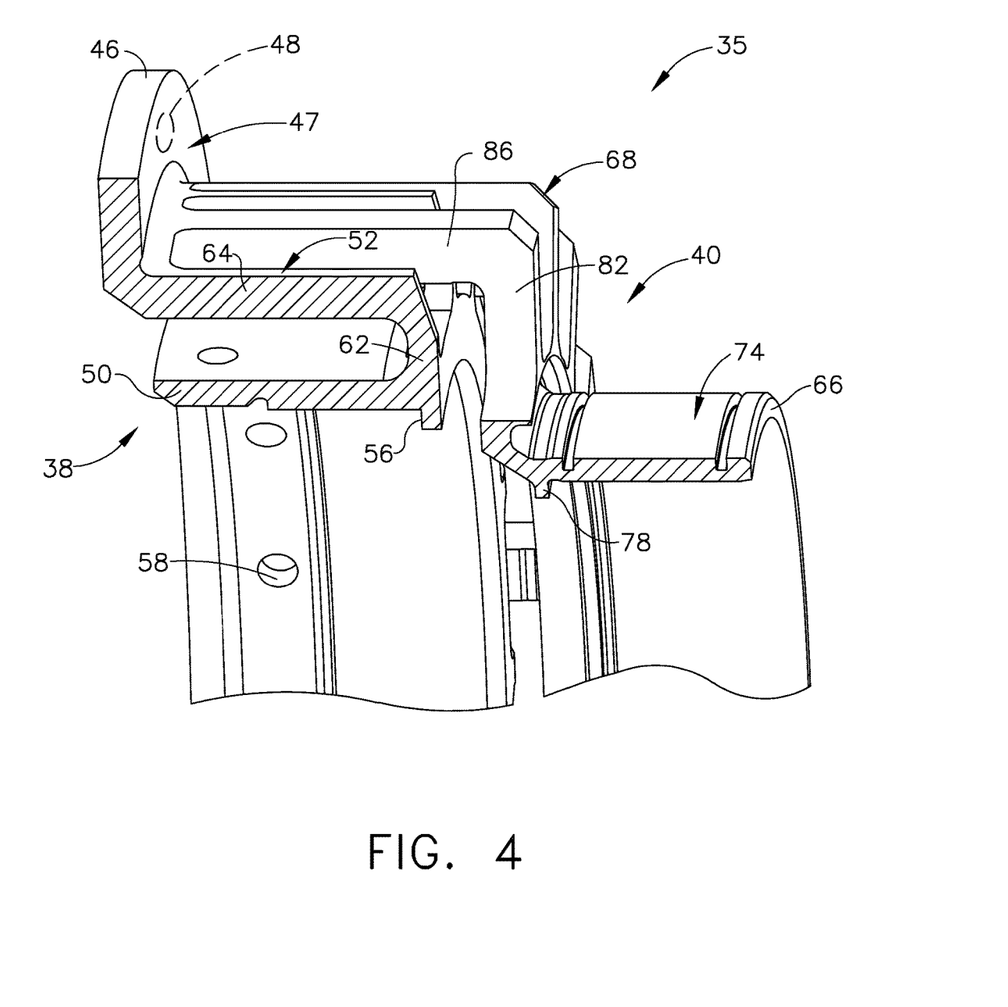
FIG. 4 is a sectional perspective view of a portion of the bearing support housing shown in FIG. 3.

As best seen in FIGS. 3 and 4, the bearing support housing 35 is a single monolithic component incorporating first and second bearing cages 38 and 40. The first bearing cage 38 supports the first bearing 32, and the second bearing cage 40 supports the second bearing 34. The bearing support housing 35 includes a single annular, radially-extending mounting flange 46 including a plurality of mounting holes 48 which receive fasteners 49 (FIG. 2). The first bearing cage 38 comprises an annular, generally axially-extending first bearing support ring 50, and a plurality of first spring arms 52 interconnecting the mounting flange 46 and the bearing support ring 50. In this example the inner surface of the first bearing support ring 50 includes a bearing stop lip 56 and a plurality of holes 58 for receiving bolts 60 (FIG. 2) used to secure the first bearing 32. Each first spring arm 52 comprises a radially-outwardly extending portion 62 joining the aft end of the first bearing support ring 50, and an axially-extending portion 64 joining the mounting flange 46. The first bearing support ring 50 extends generally parallel to the axially-extending portions 62 of the first spring arms 52 and thus lies radially inside the ring of first spring arms 52. The number, shape, and dimensions of the first spring arms 52 may be modified to suit a particular application, in particular to achieve a desired stiffness of the first bearing cage 38. It is noted that the first spring arms 52 extend axially aft from the aft face 47 of the mounting flange 46. Because the relatively large surface area of the aft face 47 serves as a base for the first spring arms 52, there is significant design freedom to alter the individual cross-sectional shape and dimensions of the first spring arms 52.

The second bearing cage 40 is similar in construction to the first bearing cage 38. It comprises an annular second bearing support ring 66 and a plurality of second spring arms 68 interconnecting the mounting flange 46 and the second bearing support ring 66. The second bearing support ring 66 includes a generally axially-extending body with a cylindrical inner surface. The outer surface 74 of the second bearing support ring 66, in cooperation with the damper housing 42, forms a portion of an oil film damper 76 of a known type. In this example the inner surface of the second bearing support ring 66 defines a bearing stop lip 78. Each of the second spring arms 68 comprises a radially-outwardly extending portion 82 joining the forward end of the bearing support ring 66, and an axially-extending portion 86 joining the mounting flange 46. The number, shape, and dimensions of the spring arms 80 may be modified to suit a particular application, in particular to achieve a desired stiffness of the second bearing cage 40.

The first and second bearing cages 38 and 40 are sized such that the first bearing support ring 50 fits inside of and axially overlaps or "nests" within the second bearing cage 40. More specifically, the outside diameter over the first bearing support ring 50 is less than the inside diameter of the second spring arms 68 of the second bearing cage 40. Furthermore, the spaces between adjacent second spring arms 68 of the second bearing cage 40 are selected so that the first spring arms 52 of the first bearing cage 38 will fit between them, resulting in an interdigitated configuration. The inner and/or outer radii of the first spring arms 52 may be equal to the inner and/or outer radii of the second spring arms 68.

The bearing cages 38 and 40 may be preferentially "clocked" or angularly offset from a symmetrical orientation relative to each other. As seen in FIG. 3, the bearing cages 38 and 40 are offset such that a first gap "G1" between each first spring arm 52 and the adjacent second spring arm 68 on one side is less than a second gap "G2" between the same first spring arm 52 and the adjacent second spring arm 68 on the other side. This clocking is useful to provide space for the passage of oil lines or other similar structures (not shown), where equal gaps might provide insufficient clearance.

In operation, the spring arms of the first and second bearing cages 38 and 40 are free to move independently of one another, as required by flight loads and the dynamics of the first and second bearings 32 and 34. This allows the harmonic response of the bearings 32 and 34 to be controlled independently.

Figure 5:
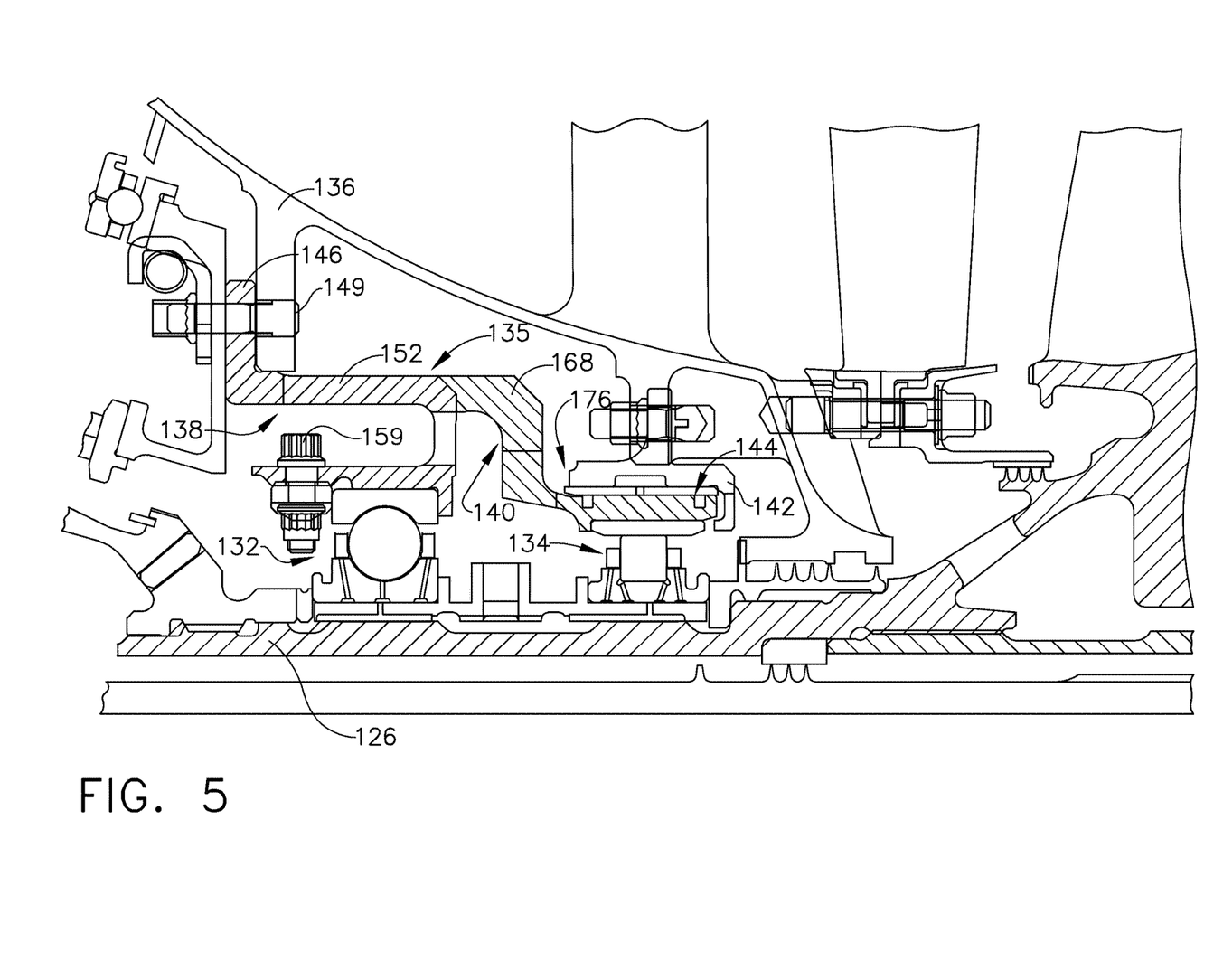
FIG. 5 is an enlarged view of a bearing compartment, showing an alternative bearing support housing.

FIG. 5 shows a portion of a sump of an engine, similar to the engine 10, including an outer shaft 126, and incorporating an alternative bearing mounting arrangement. The forward end of the outer shaft 126 is carried by a ball-type first bearing 132 and a roller-type second bearing 134 which in common nomenclature are referred to as the "#3B bearing" and the "#3R bearing", respectively. A static annular frame member referred to as a fan hub frame 136 surrounds the first and second bearings 132 and 134. The first and second bearings 132 and 134 are connected to the fan hub frame 136 by a bearing support housing 135. A stationary damper housing 142 with a cylindrical inner surface 144 surrounds the second bearing 134.

Figure 6:
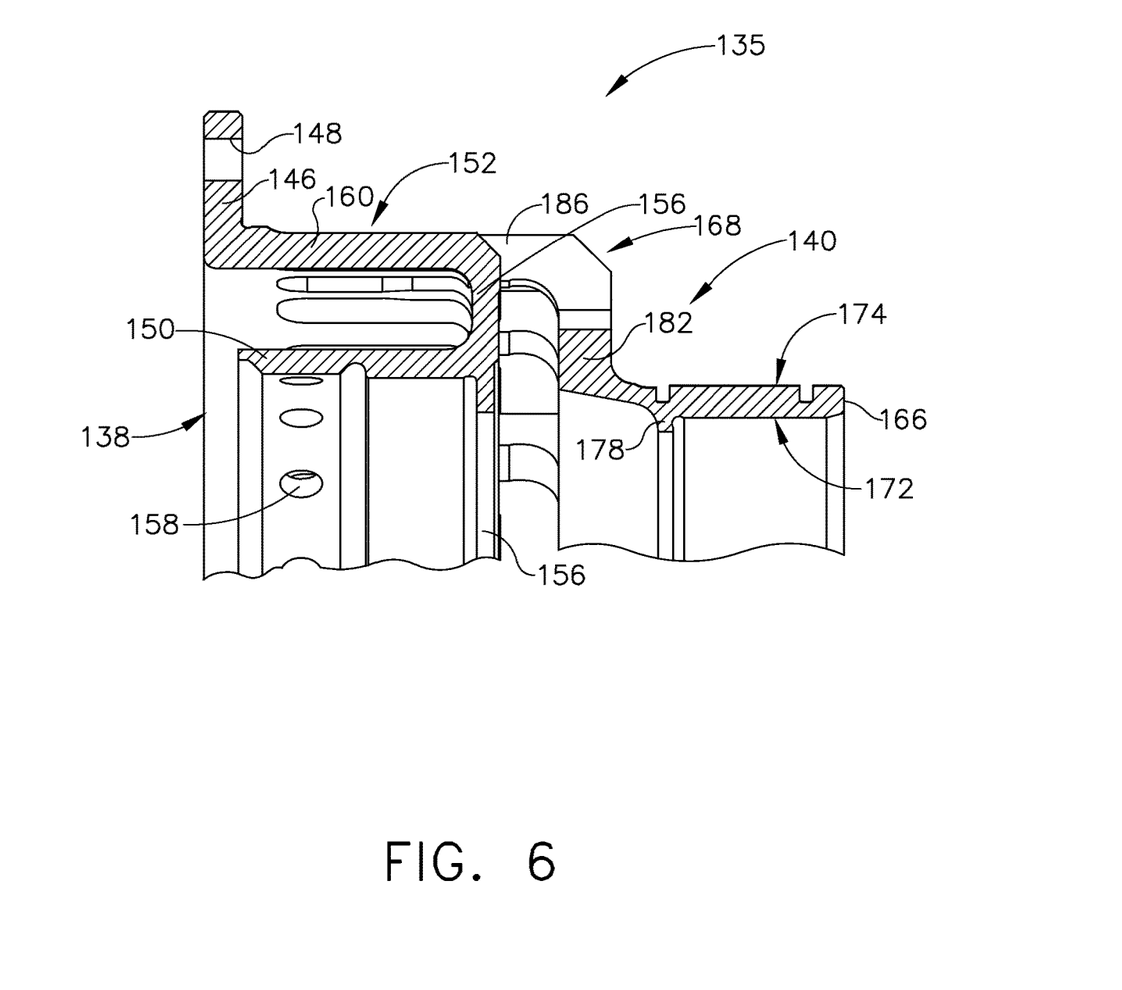
FIG. 6 is a sectional view of a portion of the bearing support housing shown in FIG. 5.
Figure 7:
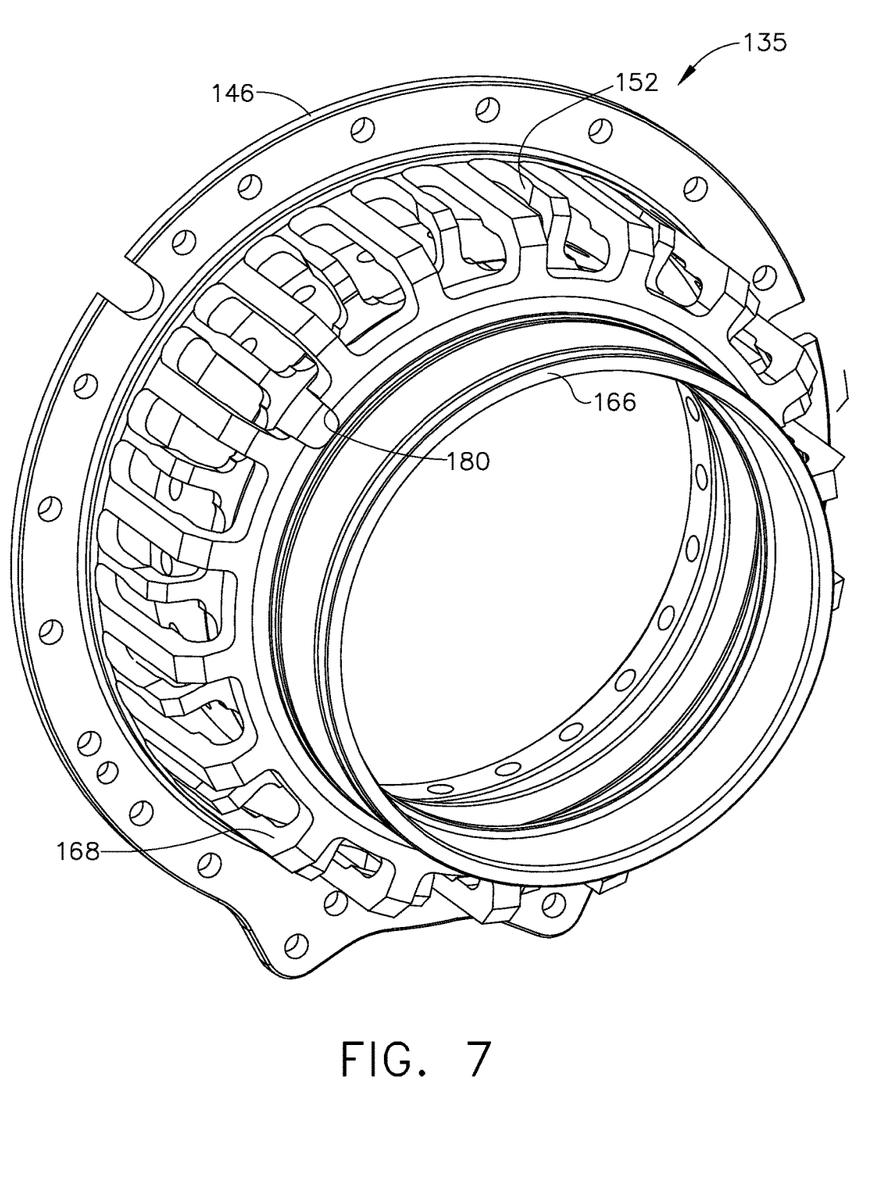
FIG. 7 is a perspective view of the bearing support housing shown in FIG. 5.

As seen in FIGS. 6 and 7, the bearing support housing 135 is a single monolithic component incorporating first and second bearing cages 138 and 140. The first bearing cage 138 supports the first bearing 132, and the second bearing cage 140 supports the second bearing 134. The bearing support housing 135 includes a single annular, radially-extending mounting flange 146 including a plurality of mounting holes 148 which receive fasteners 149 (FIG. 5). The first bearing cage 138 comprises an annular, generally axially-extending first bearing support ring 150, and a plurality of first spring arms 152 interconnecting the mounting flange 146 and the first bearing support ring 150. In this example the inner surface of the first bearing support ring 150 has a bearing stop lip 156 and a plurality of holes 158 for receiving bolts 159 (FIG. 5) used to secure the first bearing 132. Each of the first spring arms 152 comprises a radially-outwardly extending portion 156 joining the aft end of the bearing support ring 150, and an axially-extending portion 160 joining the mounting flange 146. The number, shape, and dimensions of the first spring arms 152 may be modified to suit a particular application, in particular to achieve a desired stiffness of the first bearing cage 138.

The second bearing cage 140 is similar in construction to the first bearing cage 138 and comprises an annular second bearing support ring 166, and a plurality of second spring arms 168 interconnecting the mounting flange 146 and the second bearing support ring 166. The second bearing support ring 166 includes a generally axially-extending body 170 with a cylindrical inner surface 172. The outer surface 174 of the second bearing support ring 166, in cooperation with the damper housing 142, forms a portion of an oil film damper 176 of a known type. In this example the inner surface of the second bearing support ring 166 defines a bearing stop lip 178. Each of the second spring arms 168 comprises a radially-outwardly extending portion 182 joining the forward end of the second bearing support ring 166, and an axially-extending portion 186 joining the mounting flange 146. The number, shape, and dimensions of the second spring arms 168 may be modified to suit a particular application, in particular to achieve a desired stiffness of the second bearing cage 140. As with the bearing support housing 35 described above, there is wide flexibility to change the specific shape and dimensions of the first and second spring fingers 152 and 168.

The first and second bearing cages 138 and 140 are sized such that the first bearing support ring 150 fits inside of and axially overlaps or "nests" within the second bearing cage 140. More specifically, the outside diameter over the first bearing support ring 150 is less than the inside diameter of the second spring arms 168 of the second bearing cage 140. Furthermore, the spaces between adjacent second spring arms 168 of the second bearing cage 140 are selected so that the first spring arms 152 of the first bearing cage 138 will fit between them, resulting in an interdigitated configuration. The inner and/or outer radii of the first spring arms 152 may be equal to the inner and/or outer radii of the second spring arms 168.

The bearing cages 138 and 140 may be preferentially "clocked" or angularly offset from a symmetrical position relative to each other, as described above. In the example illustrated in FIGS. 5-7, the bearing cages 138 and 140 are clocked symmetrically to each other. One or more release slots 180 are formed at the forward end of the second bearing support ring 166 to provide for the passage of an oil line or nozzle (not shown).

The operation of the bearing support housing 135 is substantially identical to the operation of the bearing support housing 35 described above.

The bearing support housing configurations described above significantly reduce the axial and radial space required to fit multiple spring bearing cages into a bearing sump by nesting the cages together so they occupy the axial and radial space of one bearing cage. Engines which previously would have been unable to accommodate multiple spring bearing cages and dampers in the available sump space can now be arranged to include these features. While the nested bearing cage concept has been described with respect to a particular bearing arrangement, the concept may be used in any sump or location in the engine where it is desirable to provide multiple spring cages in a limited space. In addition to the overall product benefits of reduced part count (e.g. simplified logistics, handling, assembly), the single-piece design described herein also allows for the elimination of a joint between bearing cages, thus simplifying the flange configuration and reducing the overall stack-up.

The foregoing has described a bearing support housing for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A monolithic bearing support housing for a gas turbine engine, comprising:
   a singular annular mounting flange;
   a first bearing cage comprising:
      an annular first bearing support ring; and
      an annular array of axially-extending first spring arms interconnecting the first bearing support ring and the mounting flange; and
   a second bearing cage comprising:
      an annular second bearing support ring; and
      an annular array of axially-extending second spring arms interconnecting the second bearing support ring and the mounting flange, the second spring arms defining spaces therebetween;
   wherein the first bearing support ring extends axially and is disposed parallel to the annular array of first spring arms and located radially inside the annular array of first spring arms, and wherein forward and aft axial ends of the first bearing support ring lie within forward and aft axial ends of the annular array of first spring arms, and the first spring arms are received between the second spring arms, and the bearing cages are sized so as to permit independent flexing motion of the first and second spring arms.

2. The bearing support housing of claim 1 wherein each of the first and second spring arms extends axially from an aft face of the mounting flange.

3. The bearing support housing of claim 1 wherein each of the first spring arms includes:
   an axially-extending portion joining the mounting flange; and
   a radially-inwardly-extending portion joining the first bearing support ring.

4. The bearing support housing of claim 3 wherein:
   each of the second spring arms includes:
      an axially-extending portion joining the mounting flange; and
      a radially-inwardly-extending portion joining the second bearing support ring; and
   wherein an axial gap is defined between the first bearing support ring and the radially-inwardly-extending portions of the second spring arms.

5. The bearing support housing of claim 4 wherein the second bearing support ring extends axially away from the second spring arms.

6. The bearing support housing of claim 1 wherein the mounting flange has a plurality of mounting holes formed therethrough.

7. The bearing support housing of claim 1 wherein at least one of the bearing support rings includes a cylindrical inner surface.

8. The bearing support housing of claim 1 wherein at least one of the bearing support rings includes a bearing stop lip.

9. The bearing support housing of claim 1 wherein the first and second spring arms are arranged such that a first gap between each first spring arm and the adjacent spring arm on one side is less than a second gap between the same one of the first spring arms and the adjacent spring arm on the other side.

10. A monolithic bearing assembly for a gas turbine engine, comprising:
   a singular annular mounting flange secured to a stationary member of the engine;
   a first bearing cage comprising:
      an annular first bearing support ring; and
      an annular array of axially-extending first spring arms interconnecting the first bearing support ring and the mounting flange;
   a rolling-element first bearing mounted in the first bearing support ring;
   a second bearing cage comprising:
      an annular second bearing support ring; and
      an annular array of axially-extending second spring arms interconnecting the second bearing support ring and the mounting flange, the second spring arms defining spaces therebetween;
   a rolling-element second bearing mounted in the second bearing support ring; and
   a shaft mounted in the first and second bearings;
   wherein the first bearing support ring extends axially and is disposed parallel to the annular array of first spring arms and located radially inside the annular array of first spring arms, and wherein forward and aft axial ends of the first bearing support ring lie within forward and aft axial ends of the annular array of first spring arms, and the bearing cages are sized so as to permit independent flexing motion of the first and second spring arms.

11. The bearing assembly housing of claim 10 wherein each of the first and second spring arms extends axially from an aft face of the mounting flange.

12. The bearing assembly of claim 10 wherein each of the first spring arms includes:
   an axially-extending portion joining the mounting flange; and
   a radially-inwardly-extending portion joining the first bearing support ring.

13. The bearing assembly of claim 12 wherein:
   each of the second spring arms includes:
      an axially-extending portion joining the mounting flange; and
      a radially-inwardly-extending portion joining the second bearing support ring; and
   wherein an axial gap is defined between the first bearing support ring and the radially-inwardly-extending portions of the second spring arms.

14. The bearing assembly of claim 13 wherein the second bearing support ring extends axially away from the second spring arms.

15. The bearing assembly of claim 13 wherein the generally axially-extending portion of the second bearing support ring includes a cylindrical outer surface.

16. The bearing assembly of claim 15 further comprising a stationary damper housing surrounding the second bearing support ring; wherein the damper housing and the second bearing support ring cooperatively define an oil film damper.

17. The bearing assembly of claim 10 wherein the mounting flange has a plurality of mounting holes formed therethrough.

18. The bearing assembly of claim 17 wherein the mounting flange is secured to the stationary structure by a plurality of fasteners passing through mounting holes formed in the mounting flange.

19. The bearing assembly of claim 10 wherein at least one of the bearing support rings includes a cylindrical inner surface.

20. The bearing assembly of claim 10 wherein at least one of the bearing support rings includes a bearing stop lip.

21. The bearing assembly of claim 10 wherein the first and second spring arms are arranged such that a first gap between each first spring arm and the adjacent spring arm on one side is less than a second gap between the same one of the first spring arms and the adjacent spring arm on the other side.

* * * * *